United States Patent
Dvorak et al.

(10) Patent No.: US 8,001,792 B1
(45) Date of Patent: Aug. 23, 2011

(54) TURBINE INLET NOZZLE GUIDE VANE MOUNTING STRUCTURE FOR RADIAL GAS TURBINE ENGINE

(75) Inventors: Marek Dvorak, Kojcice (CZ); R. Jan Mowill, Hengelo (NL)

(73) Assignee: OPRA Technologies B.V., Hengelo (NL)

( * ) Notice: Subject to any disclaimer, the term of this patent is extended or adjusted under 35 U.S.C. 154(b) by 0 days.

(21) Appl. No.: 12/662,284

(22) Filed: Apr. 8, 2010

(51) Int. Cl.
*F01D 25/14* (2006.01)
*F01D 25/26* (2006.01)

(52) U.S. Cl. .............. 60/799; 60/805; 60/806; 415/116; 415/136; 415/164; 415/173.1; 415/173.2; 415/175; 415/176; 415/178; 29/889.22

(58) Field of Classification Search .......... 415/136–137, 415/173.1, 173.3, 159–166, 173.2, 138, 116–117, 415/175–178; 60/799, 805, 806; 29/889.22
See application file for complete search history.

(56) References Cited

U.S. PATENT DOCUMENTS

| | | | |
|---|---|---|---|
| 3,362,681 A | | 1/1968 | Smuland |
| 3,907,457 A | * | 9/1975 | Nakamura et al. ............ 415/112 |
| 4,054,398 A | * | 10/1977 | Penny ........................... 415/160 |
| 4,247,247 A | | 1/1981 | Thebert |
| 4,657,476 A | * | 4/1987 | Berg ............................. 415/164 |
| 5,078,576 A | | 1/1992 | Hayton |
| 5,344,284 A | | 9/1994 | Delvaux et al. |
| 5,380,154 A | | 1/1995 | Norton et al. |
| 5,459,995 A | | 10/1995 | Norton et al. |
| 6,863,495 B2 | | 3/2005 | Halliwell et al. |
| 2006/0245926 A1 | | 11/2006 | Hillier et al. |

* cited by examiner

*Primary Examiner* — Christopher Verdier
(74) *Attorney, Agent, or Firm* — Finnegan, Henderson, Farabow, Garrett & Dunner, L.L.P.

(57) ABSTRACT

Apparatus for channeling combustion gases to a turbine in a gas turbine engine. The engine has a compressor for providing compressed air, a combustor for combusting fuel with the compressed air to provide combustion gases, and a radial inflow turbine having an inlet configured to receive the combustion gases. The turbine is rotatable about an axis for expanding the combustion gases to produce work. The apparatus includes a subassembly of plurality of nozzle guide vanes fixed between a pair of spaced apart, ring-shaped sidewalls. A pair of spaced apart supports is configured to position the subassembly therebetween, concentric with the axis, and adjacent the turbine inlet. The apparatus further includes a plurality of bolt assemblies extending axially through the pair of supports, apertures in the sidewalls, and holes in the guide vanes. The sidewall apertures and guide vane holes each have an internal dimension in the radial direction sized and configured to accommodate thermal expansion and/or contraction sliding radial movement of the subassembly relative to the supports.

16 Claims, 5 Drawing Sheets

TURBINE INLET NOZZLE GUIDE VANE MOUNTING STRUCTURE FOR RADIAL GAS TURBINE ENGINE

FIELD OF THE INVENTION

This present invention relates to gas turbine engines for providing propulsion and/or mechanical work. More specifically, the present invention relates to structure for mounting inlet nozzle guide vanes for directing hot combustion gases to a radial inflow turbine.

BACKGROUND OF THE INVENTION

Radial turbine engines, and particularly larger radial turbine engines with a radial inflow turbine, pose a different challenge compared to axial turbine engines. The radial inflow turbine already has a comparatively large diameter relative to comparable axial turbine engines but requires additional structure with a still larger diameter for the static components.

These static components include nozzle guide vanes for directing the hot combustion gases into the turbine inlet, and mechanical structure which fixes the centricity and clearance between the coupled compressor and turbine components.

In smaller turbine engines with less radial extensions, and indeed with lower turbine inlet temperatures, simpler designs are being used. But larger, advanced radial turbines with turbine inlet temperatures of 1000 degrees C. and higher require the special solutions described in this disclosure in order to avoid or mitigate distortions and excess displacements due to differential thermal radial expansion and/or contraction and, as a consequence, leakage and loss of engine performance.

SUMMARY OF THE INVENTION

In accordance with the present invention, as embodied and broadly described herein, there is disclosed apparatus for channeling combustion gases to a radial turbine in a gas turbine engine, the engine having a compressor for providing compressed air, a combustor for combusting fuel with the compressed air to provide combustion gases, and a turbine inlet configured to receive the combustion gases, the turbine being rotatable about an axis for expanding the combustion gases to produce work. The apparatus includes a flow path for the combustion gases between the combustor and the turbine inlet, the flow path having a radial portion. The apparatus also has a plurality of nozzle guide vanes, and means for mounting the guide vanes in the flow path portion, with the guide vanes being angularly distributed about, and concentric with, the turbine axis proximate the radial turbine inlet. The mounting means permits thermal expansion and/or contraction radial movement of the guide vanes relative to the turbine axis during engine operation.

Also, in accordance with the invention, as embodied and broadly described herein, there is disclosed apparatus for channeling combustion gases to a turbine in a gas turbine engine. The engine has a compressor for providing compressed air, a combustor for combusting fuel with the compressed air to provide combustion gases, and a radial inflow turbine having an inlet configured to receive the combustion gases. The turbine is rotatable about an axis for expanding the combustion gases to produce work. The apparatus includes a plurality of nozzle guide vanes each having opposed axial ends and an axially directed hole. The apparatus also includes a pair of ring-shaped, spaced apart sidewalls, and the guide vanes are attached between the sidewalls in an angularly spaced relation relative to the turbine axis and are oriented for receiving the combustion gases from the combustor and directing the gases into the turbine inlet. The apparatus further includes a pair of spaced apart supports configured to position the sidewalls and attached guide vanes concentric with the axis and adjacent the turbine inlet, at least one of the supports also being configured to be secured to the engine. The apparatus further includes means for capturing the sidewalls and attached guide vanes between the ring supports to permit thermal expansion and/or contraction radial movement of the sidewalls and attached guide vanes relative to the supports during engine operation. The capturing means includes a plurality of bolt assemblies each having a bolt member extending axially through the supports, through apertures in the sidewalls, and through the holes in the guide vanes. The apertures and holes each have an internal dimension in the radial direction sized to accommodate sliding radial movement relative to a respective bolt member.

Further, in accordance with the present invention, as embodied and broadly described herein, there is disclosed an inlet nozzle subassembly for an engine having a radial inflow gas turbine. The turbine has an axis and a radially directed inlet. The apparatus includes a plurality of nozzle guide vanes each having opposed axial ends, and a pair of ring-shaped nozzle side walls configured for holding the guide vanes therebetween in an angularly spaced distribution about the turbine axis. The subassembly also includes a plurality of hollow bushings fixedly attaching the opposed axial ends of each guide vane to a respective adjacent sidewall, to establish the angularly spaced distribution, and a plurality of pins interconnecting each guide vane axial end to the respective adjacent sidewall. The pins are located angularly spaced from the bushings and establishing a pitch for the respective vane. The subassembly further includes a plurality of through-holes formed interior to the bushings, and axially through both sidewalls and the guide vanes. The through-holes are configured for replaceably mounting the inlet nozzle subassembly to the engine using bolt assemblies, and for permitting thermal expansion and/or contraction radial movement of the inlet nozzle subassembly relative to the bolt assemblies.

Still further in accordance with the present invention, as embodied and broadly described herein, a method of configuring the mid-section of a gas turbine engine having a radial inlet turbine with an axis of rotation is disclosed. The engine also has a compressor and a diffuser for providing compressed air, a combustor for combusting fuel with the compressed air to generate combustion gases, and a turbine shroud for channeling the combustion gases during work producing expansion through the turbine. The method includes providing a pair of annular support members surrounding the turbine axis at the turbine inlet, the support members being fixedly held spaced-apart in the axial direction, fixedly attaching one of said support members to the compressor diffuser to be supported thereby, and adjustably attaching the turbine shroud to the other of said support member to be supported thereby. The method also includes positioning an annular nozzle guide vane subassembly axially between the spaced-apart support members and capturing the inlet nozzle guide vane subassembly by the support members. The capturing includes establishing the concentricity of the nozzle guide vane subassembly relative to the turbine axis and allowing thermally induced radial expansion and/or contraction relative movement between the nozzle guide vane subassembly and the axially adjacent support members during engine operation.

Additional aspects of the invention will be set forth in part in the description which follows, and in part will be obvious from the description, or may be learned by practice of the invention. The one or more advantage of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF DISCLOSED EMBODIMENTS

Figure 1A:
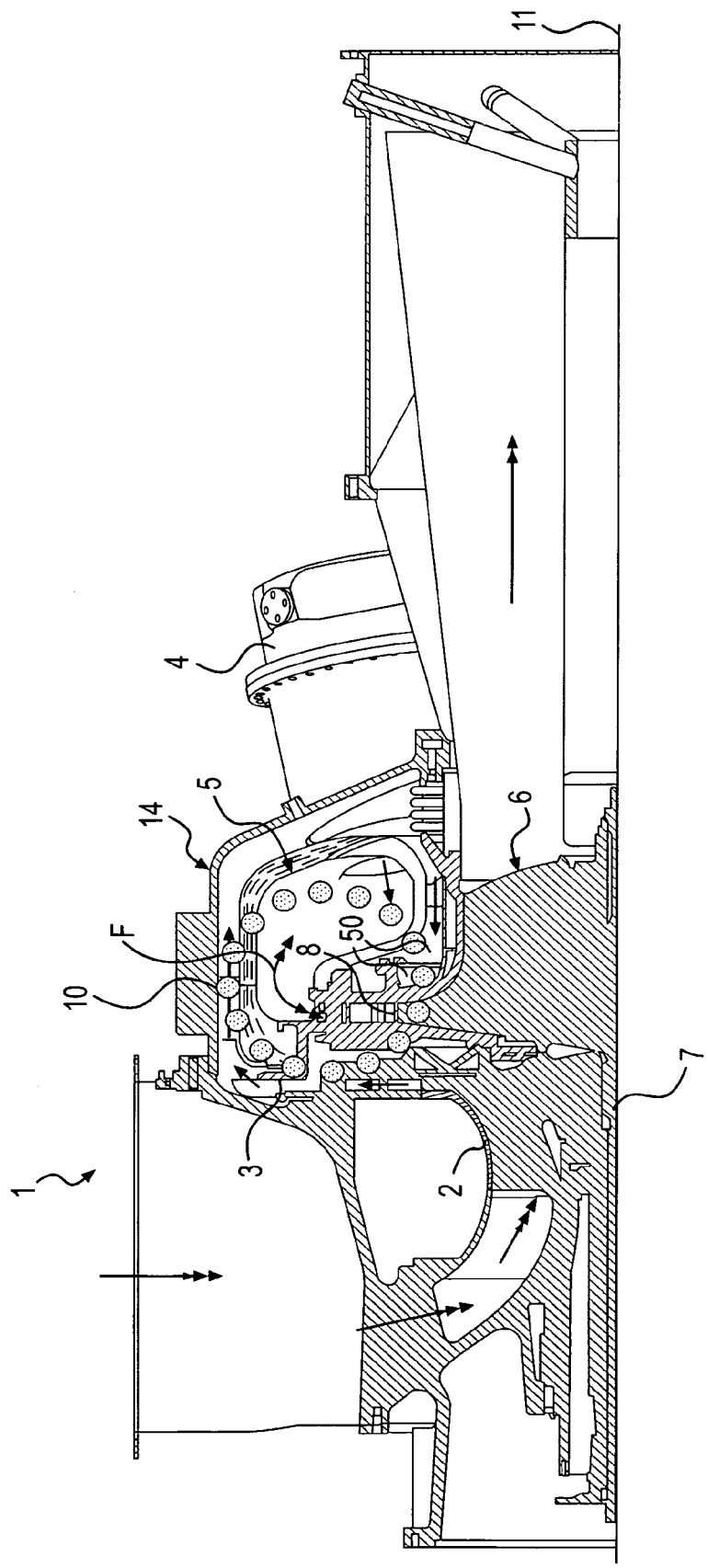
FIG. 1A is a partial cross-sectional schematic view of a gas turbine engine with a radial inflow turbine having an engine mid-structure configured in accordance with the present invention.

With initial reference to FIG. 1A (with the new mid-structure) there is shown a gas turbine engine indicated by the numeral 1 and having a mid-structure 10 in accordance with the present invention. Engine 1 has a centrifugal compressor 2 and a diffuser 3 for providing compressed air for combustion with fuel. FIG. 1A also depicts one of four combustors 4 for combusting the fuel/air mixture which is delivered into the manifold 5 and then into a radial inflow turbine 6 for expanding the hot combustion gases to produce work. Compressor 2 and turbine 6 are coupled by a shaft assembly 7 and rotate about axis 11 within engine casing 14. Also shown in FIG. 1A is flow path "F" (designated by a double arrow) for the hot combustion gases exiting combustor 4 via manifold 5 and entering radial inflow turbine 6 at turbine inlet 8.

Figure 1B:
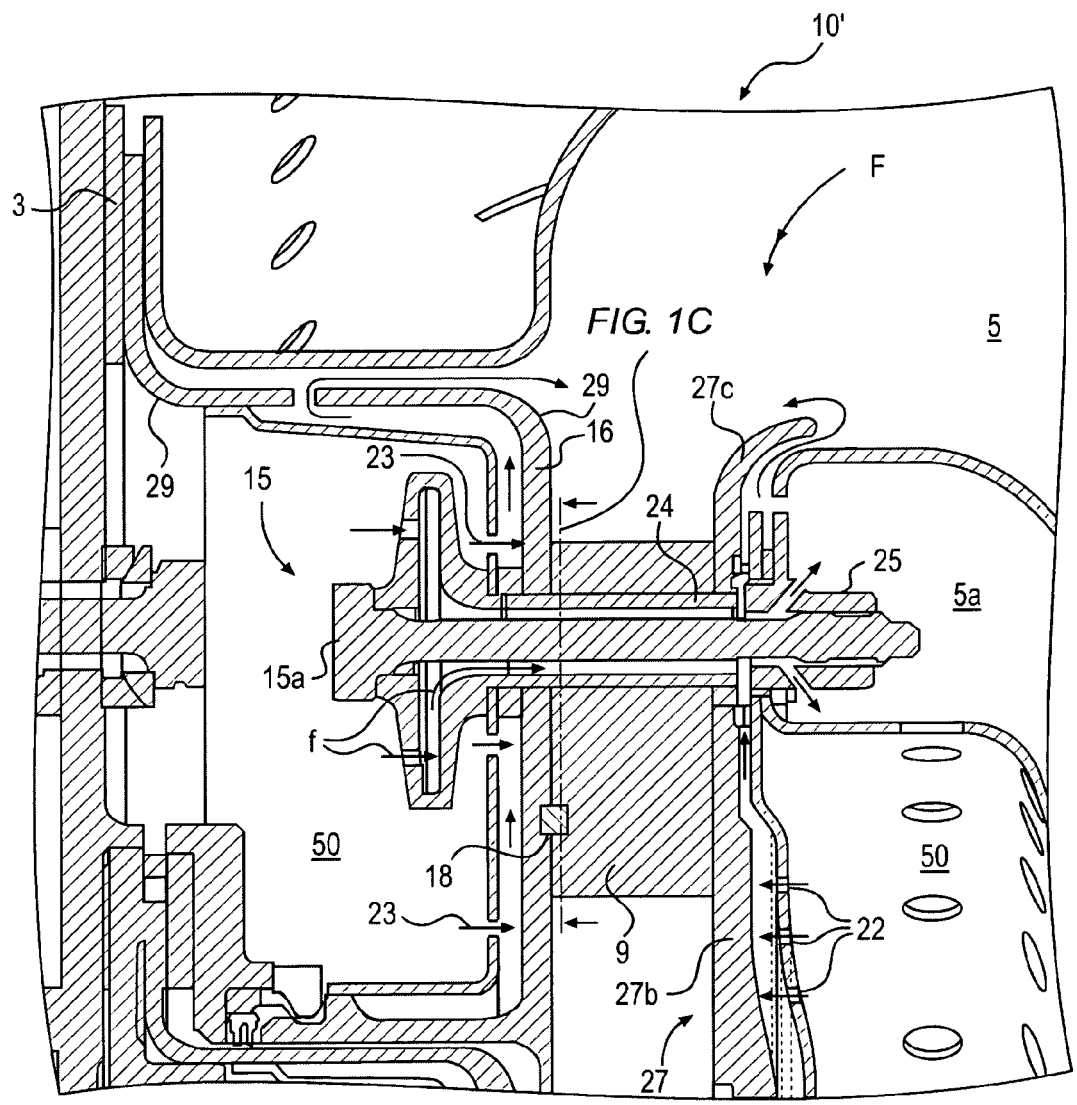
FIG. 1B is a detail of a conventional mid-structure of an engine of the type shown in FIG. 1A.
Figure 1C:
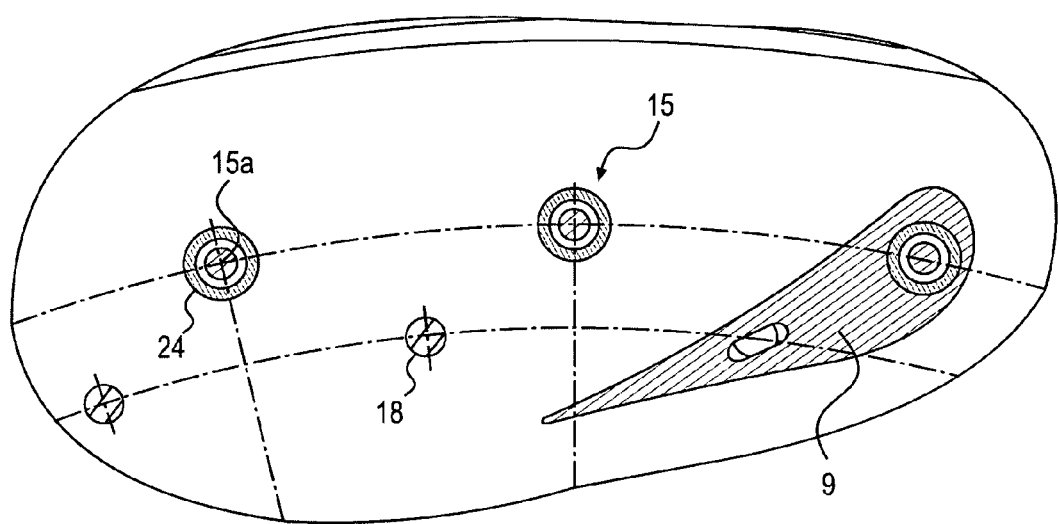
FIG. 1C is a detail of a nozzle guide vane of the engine mid-structure in FIG. 1B.

FIG. 1B shows a conventional engine mid-structure 10' where nozzle guide vanes 9 are used to impart a preferred direction for the incident hot combustion gases on the blades of turbine 6. In the FIG. 1B construction, the nozzle guide vanes 9 are supported by bolt assemblies 15 between the support structure 27c on one axial side of guide vane 9 and the support structure 16 on the other side of guide vane 9. Each nozzle guide vane 9 is rigidly clamped by a respective bolt assembly 15, which includes bolt 15a, sleeve 24, and nut 25, and which is air-cooled (see arrows f in FIG. 1B). Sleeves 24, and pins 18 lock the guide vanes 9 to the support structure 16. The angular locations of the guide vanes 9 about axis 11 are determined by sleeves 24 and the angles of the guide vanes 9 relative to axis 11 are set by pins 18. See also a detail of a conventional nozzle guide vane 9 in FIG. 1C.

A significant problem with the FIG. 1B construction is that the supports 16 and 27c experience unequal heating and/or cool down during engine operation, such that support structure 27c expands radially relative to support structure 16, due to its proximity to manifold 5 and/or difficulty with adequately cooling support 27c. In an attempt to take up the difference in radial expansion between support structures 16 and 27c caused by different temperature and/or different cooling, support structure 27c was equipped with radial slots to allow sliding between guide vane 9, sleeve 24 and support structure 27c. However, from operational experience, no sliding marks were noticed and thus vanes 9 and sleeve 24 were not moving relatively to support structure 27c. The uneven radial expansion and/or contraction can cause bolt assemblies 15 to "cock," that is, to incline relative to axis 11, thereby creating leakage flow paths past guide vanes 9 and degrade engine performance. The radial difference between support structures 16 and 27c can also cause large stresses in bolt assemblies 15.

Moreover, as guide vane support structure 27c in the FIG. 1B configuration, which is part of the turbine shroud 27 and is clamped with guide vane 9 and manifold 5 to support 16 by bolt assembly 15, the overall structure is complicated and the parts can have different temperatures at a given engine heat level, with the result that non-predictable, and sometimes permanent, deformations under heat load can result. In the FIG. 1B configuration, turbine shroud 27 is cooled by a combination of impingement cooling holes 22 in lower shroud section 27b and convection cooling in upper shroud section/ guide vane support 27c using air from dilution air passage 5a of manifold 5. In comparison, guide vane support 16 in the FIG. 1B construction is cooled by impingement cooling through holes 23 along its entire radial extent using pressurized air in the plenum 50 in engine casing 14.

While the present invention is not restricted to the gas turbine engines of the general type shown in FIG. 1A, the invention to be described in more detail hereinafter is especially useful in gas turbine engines of the general type as shown in FIG. 1A, namely gas turbine engines having a centrifugal compressor and a closely coupled radial inflow turbine. Hence, the invention to be discussed hereinafter in relation to FIGS. 2-4C involves an improved mid-structure for a gas turbine engine of the centrifugal compressor/radial inflow type. For convenience and ease of understanding, identical or structurally similar parts in the Figures will be given the same reference number but with the understanding that the parts may differ significantly in their configuration and/or performance from their conventional counterparts in FIGS. 1B-1C, as will be appreciated from the subsequent discussion and the drawings themselves. The invention in its broadest scope is intended to be limited only by the claims and their equivalents.

Figure 2:
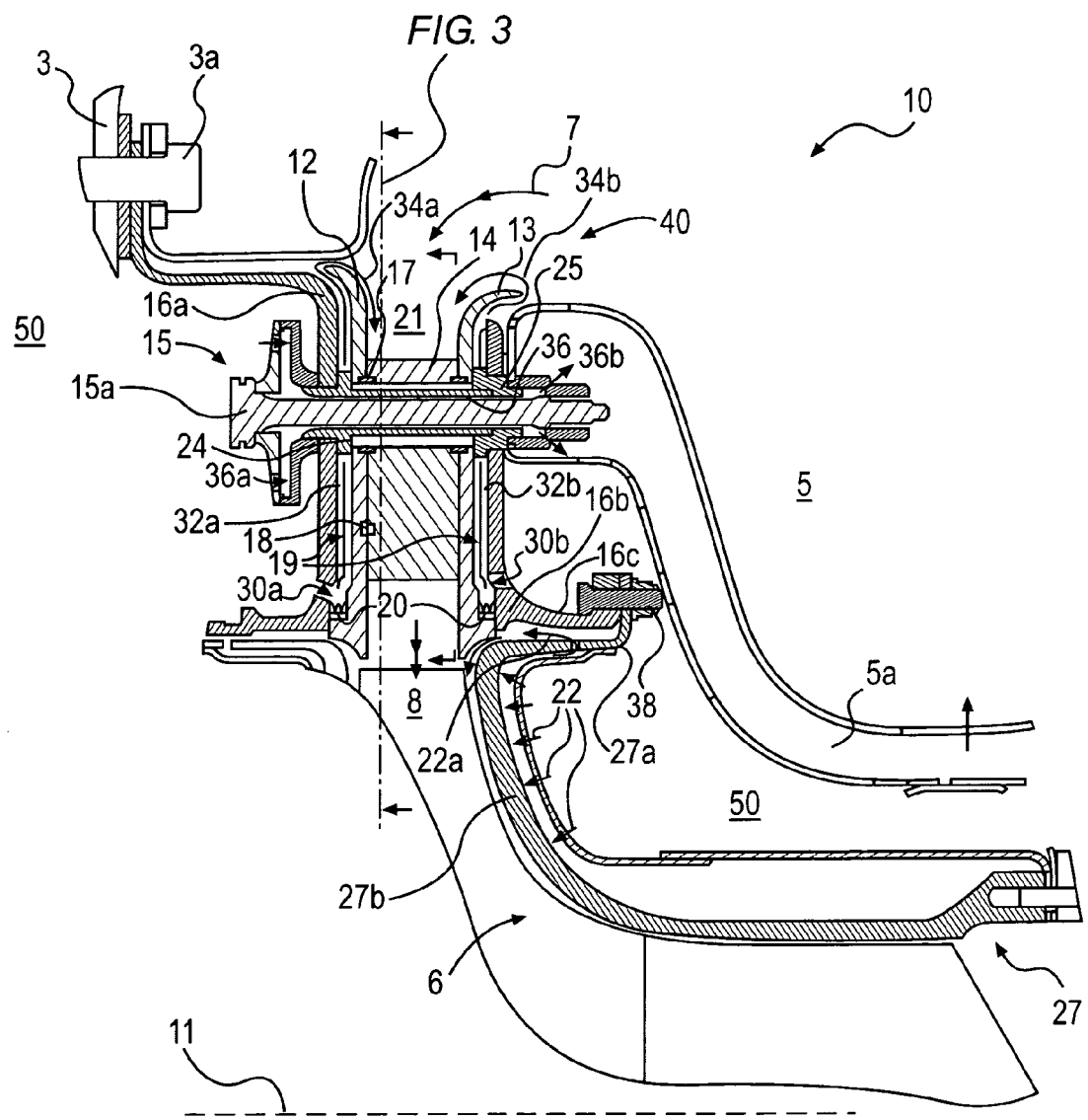
FIG. 2 is a side plan cross-sectional view of the mid-structure configured in accordance with the present invention for mounting nozzle guide vanes of the engine illustrated in FIG. 1A.

In accordance with the present invention, as embodied herein, FIG. 2 shows generally an engine mid-structure 10 including annular front and rear nozzle guide vane supports 16a, 16b axially spaced apart and surrounding axis 11. The upper part of front support 16a is attached to the compressor diffuser 3 by a plurality of angularly spaced locating bolts 3a. This connection centers the whole engine mid-structure, relative to the turbine axis 11. Rather than mount guide vanes 9 directly to opposed supports 16a, 16b as is conventional, the nozzle guide vanes 9 in the FIG. 2 embodiment are held between sidewalls 12, 13. Specifically, front sidewall 12 and rear sidewall 13 clamp the nozzle guide vanes 9 between them, and the resulting nozzle subassembly 40 is, in turn, "captured" by supports 16a, 16b using bolt assemblies 15, which includes bolt member 15a, as will now be discussed.

Importantly, both sidewalls 12, 13 have "racetrack"-shaped apertures 26, and guide vanes 9 have racetrack-shaped holes 42 to allow the hot nozzle structure 40 to slide radially relative to the supports 16a, 16b. The "racetrack" shape has generally parallel elongated sides and generally circular ends. Racetrack guide vane holes 42 are slightly larger than the racetrack sidewall apertures 26 to allow adjustment of nozzle guide vanes 9. Bolt assemblies 15, each including bolt 15a, spacer sleeve 24 and nut 25, are configured to axially space apart the front support 16a and the rear support 16b by a predetermined distance to permit the radial sliding movement of nozzle guide vane subassembly 40.

Figure 3:
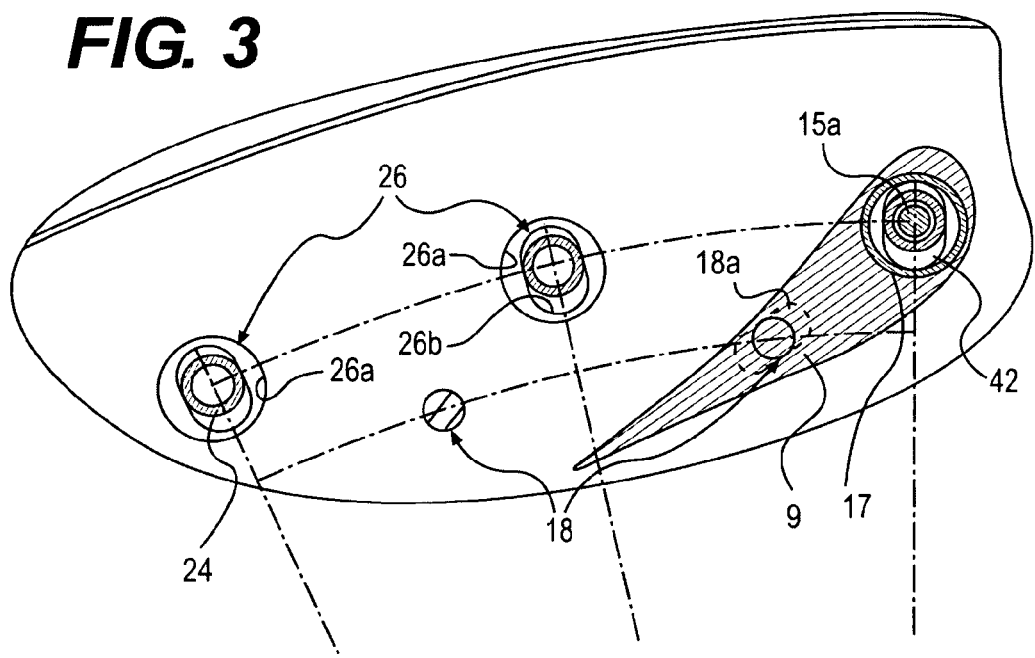
FIG. 3 is an axial end view of one of the nozzle guide vanes in FIG. 2.

As depicted in FIG. 3, bushings 17 and pins 18 lock the guide vanes 9 into the sidewalls 12, 13. The angular locations of the guide vanes 9 about axis 11 are determined by bushings 17, and the pitch of the individual guide vanes 9 is set by respective pins 18 in sidewall 12 engaging elongated slots 18a in guide vanes 9 (see FIGS. 4A and 4B). Although two bushings 17 are shown for each guide vane, a single bushing extending between the sidewalls through the guide vane may be used in some applications.

With reference again to FIG. 2, cooling air enters peripheral inlets 30a, 30b at the roots of supports 16a, 16b and flows along paths 32a, 32b behind respective radiation shields 19. In order to avoid loss of cooling air in cooling paths 32a, 32b between supports 16a, 16b and sidewalls 12, 13, seals 20 which allow relative movement, are placed between radially inner parts of the sidewalls 12, 13 and the respective supports 16a, 16b. Cooling path inlets 30a, 30b in supports 16a, 16b may be configured to allow inspection of seals 20. After passing through paths 32a, 32b, the cooling air exits to compressor outlet manifold region 21 at exits 34a, 34b.

As stated previously, supports 16a, 16b are held in proper spaced apart axial positions by sleeve 24 and spacer nut 25 of bolt assembly 15, to protect against clamping the subassembly structure 40 by bolts 15a and hindering the sliding thermal radial expansion and/or contraction of the subassembly 40 relative to bolt assemblies 15 and supports 16a, 16b. Also, each bolt assembly 15 may be air cooled by cooling air passageway 36 between sleeve 24 and bolt member 15a. The bolt assembly cooling air enters passageway 36 at inlets 36a, and then exits at outlets 36b to the manifold annular cooling passageway 5a.

In particular, the annular nozzle guide vane supports 16a, 16b in the FIG. 2 embodiment are configured similarly and have essentially the same cooling arrangement, namely respective convection cooling passages 32a, 32b, each with internal radiation heat shield elements 19, and are supplied by cooling air through holes 30a, 30b from the same general source, namely the pressurized air in plenum 50 of engine casing 14 and not cooling air used previously for cooling the turbine shroud, as is conventional. This "symmetric" support and cooling construction will reduce any cocking tendencies in the bolt assemblies 15 created by different radial expansions and/or contractions between nozzle guide vane supports 16a, 16b, due to the different heat loads or cool down rates.

As best seen in FIG. 2, flange 27a of turbine shroud 27 is bolted and pinned to flange 16c of rear support 16b by bolts 38, in order to mitigate the thermal distortion of the turbine shroud and/or the nozzle guide vane support structure. Upper part 27b of shroud 27 is cooled by impingement cooling holes 22 using cooling air supplied separately from the pressurized air in plenum 50 of engine casing 14, flows along cooling space 22a between shroud upper flange 27a and lower flange part 16c of support 16b, and then exits to turbine inlet region 8 past the lower end of sidewall 13. The separately mounted turbine shroud also enables independent axial adjustment of the running clearance between shroud 27 and the blades of turbine 6 by the use of shims. The flexibly mounted turbine shroud also mitigates thermal distortion of the shroud that could be caused by the nozzle guide vane structure and vice versa. The shroud flange 27a and support flange 16c connection provides the flexibility. In FIG. 2 double arrows show the main flow of hot combustion gases, and single arrows show the cooling air flows, to facilitate comprehension.

FIG. 3 shows the sidewall-guide vane nozzle subassembly 40 and how the movement is controlled by the mounting system using racetrack-shaped apertures 26 in the sidewalls and racetrack-shaped holes 42 in the guide vanes, in conjunction with bolt assemblies 15.

Figure 4A:
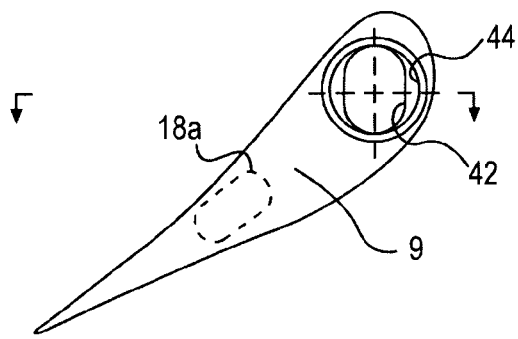
FIGS. 4A and 4B are a cross-sectional axial view and a radial top view, respectively, of the guide vane shown in FIG. 3.
Figure 4B:
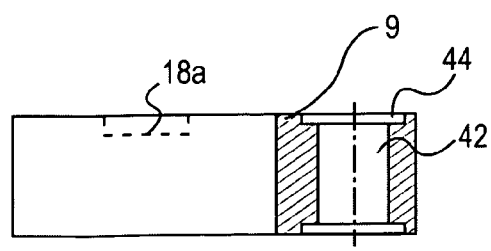

FIGS. 4A and 4B shows a guide vane 9 cut out with two-tier hole, namely a circular hole portion 44 for bushings 17, and the racetrack-shaped hole portion 42 to allow movement relative to bolt assembly 15 during heat up. The sidewalls 12 and 13 also have a two-tier aperture, namely a racetrack shaped aperture portion 26b and a circular aperture portion 26a to receive bushings 17. At least some portion of the through-holes of the bushings, the sidewalls, and the guide vanes is racetrack-shaped. See FIG. 3.

It will be appreciated from the above discussion, that the static structure surrounding turbine 6 is divided into three sections, namely (1) the guide vane/sidewall nozzle subassembly 40, (2) the spaced apart supports 16a, 16b, and (3) the turbine shroud 27, in order to facilitate design, construction, and final assembly for each section. Importantly, the nozzle guide vanes/sidewall subassembly 40 is functionally separated from the support structure, thereby eliminating or significantly reducing leakage and loss of performance. Specifically, the racetrack-shaped apertures in the sidewalls and holes in the guide vanes enable subassembly 40 to respond independently to thermal expansion and/or contraction, that is, without affecting the integrity of the supporting structure, namely supports 16a, 16b, or components structurally depending from the support structure, such as turbine shroud 27. Also, this construction including the flanged connection between turbine shroud 27 and the "hot" guide vane support 16b provides for more predictable thermal performance and ease of controlling running clearance with turbine 6.

Other embodiments of the invention will be apparent to those skilled in the art from consideration of the specification and practice of the invention disclosed herein. For example, one or more aspects of the present invention may be utilized in hybrid turbines using axial compressors with radial inflow turbines. Also, the increase radial inner dimension of the guide vane holes and sidewall apertures may have other than a "racetrack" shape and still permit sliding radial expansion and/or contraction relative to the supports. Thus, it is intended that the specification examples be considered as exemplary only, with a true scope and spirit of the invention being indicated by the following claims.

What is claimed is:

1. Apparatus for channeling combustion gases to a turbine in a gas turbine engine, the engine having a compressor for providing compressed air, a combustor for combusting fuel with the compressed air to provide combustion gases, and a radial inflow turbine having an inlet configured to receive the combustion gases, the turbine being rotatable about an axis for expanding the combustion gases to produce work, the apparatus comprising:
   a plurality of nozzle guide vanes each having opposed axial ends and an axially directed hole;
   a pair of spaced apart, ring-shaped sidewalls, the plurality of guide vanes being attached between the sidewalls in an angularly spaced relation relative to the turbine axis and oriented for receiving the combustion gases from the combustor and directing the gases into the turbine inlet, the sidewalls including axially directed apertures positioned in-line with the holes of the respective angularly spaced guide vanes;

a pair of spaced apart supports configured to position the sidewalls and attached guide vanes therebetween and concentric with the turbine axis and adjacent the turbine inlet, at least one of the supports also being configured to be secured to the engine; and means for capturing the sidewalls and attached guide vanes between the supports to permit thermal expansion and/or contraction radial movement of the sidewalls and attached guide vanes relative to the supports during engine operation, wherein the capturing means includes a plurality of bolt assemblies extending axially through the ring supports, the apertures in the sidewalls, and the holes in the guide vanes, wherein the apertures and holes each have an internal dimension in the radial direction greater than an outer dimension of the bolt assembly, the internal dimension being sized to accommodate said relative sliding thermal expansion and/or contraction radial movement.

2. The apparatus as in claim 1, wherein each aperture has a racetrack shape with a long axis oriented radially and having a dimension to allow the relative radial movement, and a short axis dimension to permit sliding.

3. The apparatus as in claim 2, wherein each of the holes in respective guide vanes also is racetrack-shaped, and has a long axis oriented radially and sized to accommodate the relative radial movement, and a short axis dimension to permit sliding.

4. The apparatus as in claim 1, wherein each bolt assembly includes a sleeve member and a bolt member configured for spacing apart the supports a predetermined distance for capturing the sidewalls and attached guide vanes therebetween.

5. The apparatus as in claim 1, wherein the bolt assemblies, supports, and sidewalls are configured to provide cooling air passageways between each support and the adjacent sidewall for convection cooling.

6. The apparatus as in claim 5, wherein radiation heat shields are positioned in the passageways.

7. The apparatus as in claim 5, wherein seals are provided between radially inner portions of each support and the adjacent sidewall, and wherein cooling air inlets for the passageways are provided in the respective supports and are configured to allow inspection of said seals.

8. The apparatus as in claim 3, wherein each of the guide vanes is attached to the sidewalls by
one or more hollow bushings extending axially between the respective guide vane and the sidewalls, the bushings being configured to surround the respective racetrack shaped sidewall aperture and guide vane hole, and
a pin extending between one of said axial ends of the respective guide vane and an adjacent one of the sidewalls, the pin being spaced from the respective sidewall aperture and guide vane hole.

9. The apparatus as in claim 1, wherein the engine further includes a stationary compressor diffuser structure, and wherein one of said supports is configured to be mounted to the diffuser structure to position the supports, the sidewalls and attached guide vanes concentric with the turbine axis.

10. The apparatus as in claim 1, wherein the engine includes a turbine shroud, wherein the turbine shroud is flexibly and adjustably mounted to one of the supports, and wherein the shroud is configured to be cooled by impingement cooling and the supports are configured to be cooled by convection cooling.

11. A nozzle guide vane subassembly for an engine having a radial inflow gas turbine, the turbine having an axis and a radially directed inlet, the nozzle guide vane assembly comprising:
a plurality of nozzle guide vanes each having opposed axial ends;
a pair of ring-shaped nozzle sidewalls configured for holding the guide vanes therebetween in an angularly spaced distribution about the turbine axis;
a plurality of hollow bushings fixedly attaching the opposed axial ends of each guide vane to a respective adjacent sidewall, to establish the angularly spaced distribution;
a plurality of pins interconnecting one of the axial ends of each guide vane to the respective adjacent sidewall, the pins being located angularly spaced from the bushings and establishing a pitch for the respective vane; and
a plurality of through-holes formed interior to the bushings, and axially through both sidewalls and the guide vanes, the through-holes being configured for replaceably mounting the nozzle guide vane subassembly to the engine using bolt assemblies, and for permitting thermal expansion and/or contraction radial movement of the nozzle guide vane subassembly relative to the bolt assemblies.

12. The nozzle guide vane subassembly as in claim 11, wherein at least some portion of each of the through-holes is racetrack-shaped having a long and a short internal dimension, and wherein the long internal dimension is oriented in the radial direction relative to the turbine axis when the subassembly is mounted to the engine to permit relative radial sliding movement with respect to the bolt assemblies.

13. The nozzle guide vane subassembly as in claim 12, wherein the racetrack portions are located in both the sidewalls and the guide vanes.

14. Method of configuring the mid-section of a gas turbine engine having a radial inlet turbine with an axis of rotation, the engine also having a compressor for providing compressed air, a combustor for combusting fuel with the compressed air to generate combustion gases, and a turbine shroud for channeling the combustion gases during work producing expansion through the turbine, the method comprising:
providing a pair of annular support members surrounding the turbine axis at the turbine inlet, the support members being fixedly held spaced-apart in the axial direction;
fixedly attaching one of said support members to a stationary structural engine member to be supported thereby;
adjustably attaching the turbine shroud to the other of said support member to be supported thereby;
positioning an annular nozzle guide vane subassembly axially between the spaced-apart support members; and
capturing the nozzle guide vane subassembly by the support members, the capturing including establishing the concentricity of the inlet guide vane nozzle subassembly relative to the turbine axis and allowing thermal induced radial expansion and/or contraction relative movement between the nozzle guide vane subassembly and the axially adjacent support members during engine operation.

15. The method as in claim 14, wherein the support members are fixedly held spaced apart by bolt assemblies, wherein the nozzle guide vane subassembly includes axial through-holes in the inlet guide vane nozzle assembly through which the bolt assemblies extend, and wherein the through-holes have an internal dimension in the radial direction sized and configured to accommodate the relative radial expansion and/or contraction movement, and a dimension in the tangential direction to permit sliding radial movement.

16. The method as I claim 14, wherein the supports are cooled by convection cooling and the turbine shroud is cooled by impingement cooling.

* * * * *